US009199229B2

(12) United States Patent
Elomari

(10) Patent No.: US 9,199,229 B2
(45) Date of Patent: Dec. 1, 2015

(54) METHOD FOR PREPARING CHA-TYPE MOLECULAR SIEVES USING COLLOIDAL ALUMINOSILICATE AND A NOVEL OCTAHYDROINDOLIUM-BASED STRUCTURE DIRECTING AGENT

(71) Applicant: Saleh Ali Elomari, Fairfield, CA (US)

(72) Inventor: Saleh Ali Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 261 days.

(21) Appl. No.: 14/079,774

(22) Filed: Nov. 14, 2013

(65) Prior Publication Data
US 2015/0132216 A1 May 14, 2015

(51) Int. Cl.
C01B 39/04 (2006.01)
B01J 29/70 (2006.01)
C01B 39/48 (2006.01)

(52) U.S. Cl.
CPC ............. B01J 29/7015 (2013.01); C01B 39/04 (2013.01); C01B 39/48 (2013.01)

(58) Field of Classification Search
CPC ....... C01B 39/04; C01B 39/48; B01J 29/7015
See application file for complete search history.

(56) References Cited

U.S. PATENT DOCUMENTS

| 4,544,538 A | 10/1985 | Zones |
| 9,056,311 B2* | 6/2015 | Elomari .................. C01B 39/48 |
| 2007/0286798 A1 | 12/2007 | Cao et al. |

OTHER PUBLICATIONS

PCT/US2014/065634, Notification of Transmittal of the International Search Report and the Written Opinion of the International Searching Authority, or The Declaration, mail date Feb. 18, 2015, 8 pages.

* cited by examiner

Primary Examiner — David M Brunsman
(74) Attorney, Agent, or Firm — Michael D. Ross

(57) ABSTRACT

The present invention is directed to a process for preparing CHA-type molecular sieves using a colloidal aluminosilicate in the presence of a octahydroindolium-based cationic structure directing agent.

10 Claims, 4 Drawing Sheets

METHOD FOR PREPARING CHA-TYPE MOLECULAR SIEVES USING COLLOIDAL ALUMINOSILICATE AND A NOVEL OCTAHYDROINDOLIUM-BASED STRUCTURE DIRECTING AGENT

FIELD OF THE INVENTION

The present invention is directed to a process for preparing CHA-type molecular sieves using a colloidal aluminosilicate composition and a 1,1,2-trimethyloctahydroindolium cation as the structure directing agent.

BACKGROUND OF THE INVENTION

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Associate (IZA) as having the structure code CHA are known. For example, the molecular sieve known as SSZ-13 is a known crystalline CHA material. It is disclosed in U.S. Pat. No. 4,544,538, issued Oct. 1, 1985 to Zones. In that patent, the SSZ-13 molecular sieve is prepared in the presence of a N-alkyl-3-quinuclidinol cation, a N,N,N-trialkyl-1-adamantammonium cation and/or, and N,N,N-trialkyl-2-exoaminonorbornane cation as the structure-directing agent (SDA).

U.S. Publication No. 2007-0286798 to Cao et al., published Dec. 13, 2007, discloses the preparation of CHA-type molecular sieves using various SDAs, including a N,N,N-trimethyl-2-adamantammonium cation.

However, known SDAs useful for making CHA materials are complex and typically not available in quantities necessary to produce CHA materials on a commercial scale. In addition, there is a continuous need to reduce the concentration of known CHA SDAs in the reaction mixture to an absolute minimum, or replace them entirely with SDAs that are cheaper, less complex and/or reduce the time necessary to form product.

It has now been found that CHA-type molecular sieves can be prepared using a colloidal aluminosilicate in the presence of the novel structure directing agent described herein below.

SUMMARY OF THE INVENTION

In accordance with the present invention there is provided a method of preparing CHA-type molecular sieves by contacting under crystallization conditions (1) a colloidal aluminosilicate composition; (2) a novel structure directing agent represented by structure (1) below; (3) at least one source of an element selected from Groups 1 and 2 of the Periodic Table; and (4) hydroxide ions.

The present invention also includes a process for preparing a CHA-type molecular sieve by:

(a) preparing a reaction mixture containing: (1) a colloidal aluminosilicate composition; (2) a novel structure directing agent represented by structure (1) below; (3) at least one source of an element selected from Groups 1 and 2 of the Periodic Table; (4) hydroxide ions; and (5) water; and (b) subjecting the reaction mixture to crystallization conditions sufficient to form crystals of the CHA-type molecular sieve.

Where the molecular sieve formed is an intermediate material, the process of the present invention includes a further post-crystallization processing in order to achieve the target molecular sieve (e.g. by post-synthesis heteroatom lattice substitution or acid leaching).

The present invention also provides a CHA-type molecular sieve having a composition, as-synthesized and in the anhydrous state, in terms of mole ratios, as follows:

|  | Broadest | Secondary |
|---|---|---|
| $SiO_2/Al_2O_3$ | 10-300 | 20-100 |
| $Q/SiO_2$ | 0.05-0.4 | 0.1-0.3 |
| $M/SiO_2$ | 0.01-0.3 | 0.02-0.1 | wherein:
(1) M is selected from the group consisting of elements from Groups 1 and 2 of the Periodic Table; and
(2) Q is a novel structure directing agent represented by structure (1) below.

DETAILED DESCRIPTION OF THE INVENTION

Introduction

Figure 1:
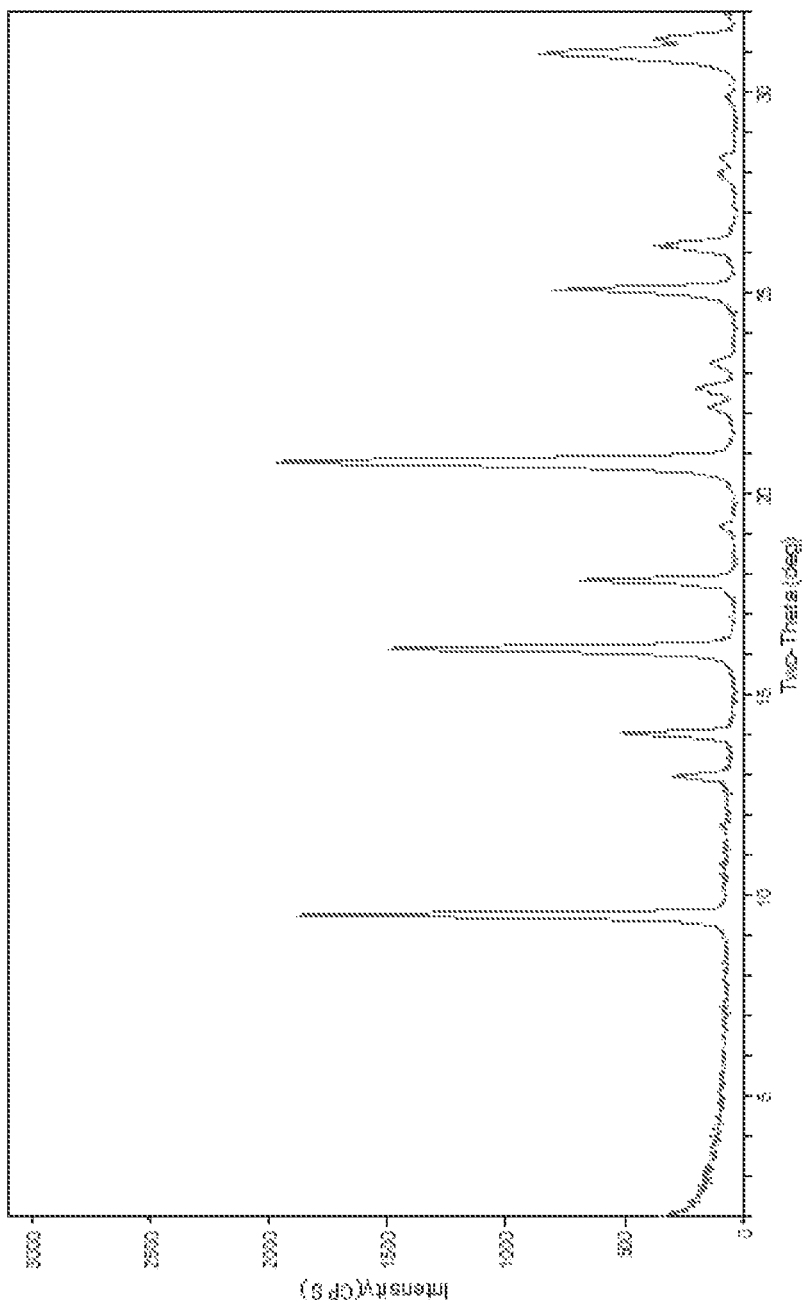
FIG. 1 shows a powder x-ray diffraction (XRD) pattern of the as-made aluminosilicate CHA molecular sieve prepared according to Example 2 of the present invention.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "molecular sieve" includes (a) intermediate and (b) final or target molecular sieves and zeolites produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C.Y. Chen and Stacey Zones, issued Sep. 14, 2004.

The term "CHA-type molecular sieve" includes all molecular sieves and their isotypes that have been assigned the International Zeolite Associate framework code CHA, as described in the *Atlas of Zeolite Framework Types*, eds. Ch. Baerlocher, L. B. McCusker and D. H. Olson, Elsevier, 6$^{th}$ revised edition, 2007. The *Atlas of Zeolite Framework Types* classifies two differently named materials, among others, as having this same topology: SSZ-13 and SSZ-62.

It will be understood by a person skilled in the art that the CHA-type molecular sieve materials made according to the process described herein may contain impurities, such as amorphous materials; unit cells having non-CHA framework topologies (e.g., MFI, MTW); and/or other impurities (e.g., heavy metals and/or organic hydrocarbons).

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

The present invention is directed to a method of making CHA-type molecular sieves using a colloidal aluminosilicate and a cyclic nitrogen-containing cation structure directing agent (SDA) represented by structure (1) below.

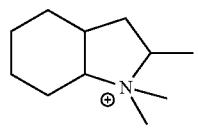

(1)

1,1,2-trimethyloctahydroindolium cation

Reaction Mixture

In general, the CHA-type molecular sieve is prepared by:
(a) preparing a reaction mixture containing: (1) a colloidal aluminosilicate composition; (2) a novel structure directing agent represented by structure (1) herein; (3) at least one source of an element selected from Groups 1 and 2 of the Periodic Table; (4) hydroxide ions; and (5) water; and
(b) subjecting the reaction mixture to crystallization conditions sufficient to form crystals of the CHA-type molecular sieve.

Where the molecular sieve formed is an intermediate material, the process of the present invention includes a further step of synthesizing a target molecular sieve by post-synthesis techniques, such as heteroatom lattice substitution techniques and acid leaching.

The composition of the reaction mixture from which the CHA-type molecular sieve is formed, in terms of molar ratios, is identified in Table 1 below:

TABLE 1

| Reactants | Broad | Subembodiment |
|---|---|---|
| $SiO_2/Al_2O_3$ | 10-300 | 20-100 |
| $M/SiO_2$ | 0.01-0.3 | 0.02-0.1 |
| $Q/SiO_2$ | 0.05-0.4 | 0.1-0.3 |
| $OH^-/SiO_2$ | 0.1-0.8 | 0.2-0.4 |
| $H_2O/SiO_2$ | 5-50 | 15-30 | wherein compositional variables M and Q are as described herein above.

Colloidal aluminosilicate compositions useful in the process described herein, and for manufacturing molecular sieves generally, are well known in the art and commercially available from suppliers such as Nalco.

As described herein above, for each embodiment described herein, the reaction mixture may be formed using at least one source of an element selected from Groups 1 and 2 of the Periodic Table (referred to herein as M). In one subembodiment, the reaction mixture is formed using a source of an element from Group 1 of the Periodic Table. In another subembodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

The SDA cation is typically associated with anions ($X^-$) which may be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The reaction mixture can be prepared either batch wise or continuously. Crystal size, morphology and crystallization time of the molecular sieve described herein may vary with the nature of the reaction mixture and the crystallization conditions.

Crystallization and Post-Synthesis Treatment

In practice, the molecular sieve is prepared by:
(a) preparing a reaction mixture as described herein above; and
(b) maintaining the reaction mixture under crystallization conditions sufficient to form the molecular sieve. (See, Harry Robson, *Verified Syntheses of Zeolitic Materials*, $2^{nd}$ revised edition, Elsevier, Amsterdam (2001)).

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 130° C. and 200° C., for a period of one to six days.

The reaction mixture may be subjected to mild stirring or agitation during the crystallization step. It will be understood by a person skilled in the art that the molecular sieves described herein may contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 0.1% and 10% of the weight of the source for silicon used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g. exposing the SDA-containing molecular sieve product to light or electromagnetic radiation that has a wavelength shorter than visible light under conditions sufficient to selectively remove the organic compound from the molecular sieve) as described in U.S. Pat. No. 6,960, 327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. $H^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve (e.g. silicate SSZ-13) can also be achieved by removing heteroatoms from the lattice by known techniques such as acid leaching.

The molecular sieve made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Characterization of the Molecular Sieve

The CHA molecular sieves made by the process of the present invention have a composition, as-synthesized and in the anhydrous state, as described in Table 2 (in terms of mole ratios), wherein compositional variables M and Q are as described herein above:

TABLE 2

|  | Broadest | Secondary |
| --- | --- | --- |
| $SiO_2/Al_2O_3$ | 10-300 | 20-100 |
| $Q/SiO_2$ | 0.05-0.4 | 0.1-0.3 |
| $M/SiO_2$ | 0.01-0.3 | 0.02-0.1 |

The CHA-type molecular sieves synthesized by the process of the present invention are characterized by their X-ray diffraction pattern (XRD). X-ray diffraction patterns representative of CHA-type molecular sieves can be referenced in M. M. J. Treacy et al., *Collection of Simulated XRD Powder Patterns for Zeolites,* 5th Revised Edition, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the X-ray diffraction pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ where θ is the Bragg angle, were read from the relative intensities of the peaks, and d, the interplanar spacing in Angstroms corresponding to the recorded lines, can be calculated.

EXAMPLES

The following examples demonstrate but do not limit the present invention.

Example 1

Synthesis of 1,1,2-trimethyloctahydroindolium Cation

The 1,1,2-trimethyloctahydroindolium cation was prepared as described in the procedure below illustrated in Scheme 1. The parent amine 2-methyloctahydroindole was prepared as described below. To a solution of 100 g of 2-methylindole in 300 ml glacial acetic acid in a 600 mL autoclave, 10 g of $PtO_2$ and 10 mL of $H_2SO_4$ were added. The mixture was sealed and pressurized with hydrogen to 1500 psig. The reaction mixture was heated at 120° C. overnight while stirring at about 400 rpm. The reaction mixture was pressurized again to 1500 psig and heated at 120° C. for several more hours. The reaction mixture was cooled and filtered to remove the catalyst. The filtrate was cooled down to ° C. and neutralized very by adding 50% aqueous NaOH solution drop wise. NaOH solution was added until a pH of ~10 was obtained. The mixture was left to stir at room temperature for an hour or so. Then, the mixture was extracted with diethyl ether (500 ml). The organic (ether) extract was dried over anhydrous MgSO4, filtered and concentrated on a rotary evaporator to give 89 g of the desired amine, 2-methyloctahydroindole, as pale yellow oil. The product was confirmed by NMR spectroscopy where the aromatic signals were no longer present.

The product synthesized as described above, 2-methyloctahydroindole, was quaternized with methyl iodide as described below. A 500 mL round bottom reaction flask equipped with a stir bar and a reflux condenser was charged with 20 g of 2-methyloctahydroindole, 61 g of methyl iodide, and 20 g of $KHCO_3$ in 250 ml of methanol. The mixture was stirred at room temperature for 48 hours. Then, the reaction was heated at reflux for 3 hours. The solution was then left to cool and was allowed to stir overnight. The reaction solution was stopped and concentrated to remove methanol. The recovered solid mass was suspended in chloroform. The resulting mixture (an organic layer and solids) was filtered. The filtrate was concentered on a rotary evaporator at reduced pressure to give tan colored solids. These solids were dissolved in minimal amount of isopropyl alcohol while heating. The resulting solution was cooled down and then diethyl ether was added gradually to help precipitate the quaternized salt (1,1,2-trimethyloctahydroindolium iodide).

The reaction afforded the desired quaternized salt in 88% yield (37 g) as off-white shinny powder. The obtained 1,1,2-trimethyloctahydroindolium iodide was dissolved in 130 ml of deionized water in 250 ml polyethylene plastic bottle. To the solution, 41 g of Bio-Rad AG 1-X8 ion exchange resins was added and the slurry was gently stirred at room temperature overnight. The slurry was then filtered and the resin was rinsed with additional 50 ml water (deionized). A small aliquot of the water layer was analyzed by titration with 0.1 N HCl to show 96% yield of the desired 1,1,2-trimethyloctahydroindolium hydroxide in solution.

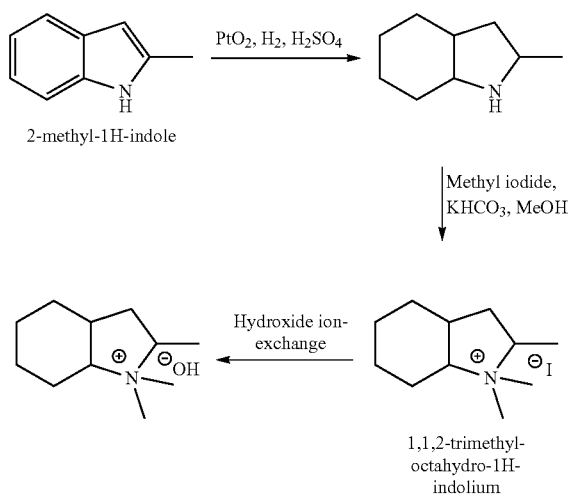

Scheme 1

Example 2

Synthesis of CHA Using 1,1,2-trimethyloctahydroindolium Cation

A 23 mL Teflon liner was charged with 3 g of 1,1,2-trimethyloctahydroindolium hydroxide solution (2 mmol of cation and 2 mmol of hydroxide), 3 g of 1N KOH solution, and 5.4 g of an aluminosilicate colloid (22% solids and $SiO_2/Al_2O_3=35$, Nalco). The resulting gel mixture was stirred thoroughly until a homogeneous fluid solution was obtained. The Teflon liner containing the resulting gel mixture was capped off and placed in a stainless steel Parr autoclave. The autoclave was affixed onto a spit rotating at 43 rpm in an oven at 170° C. The gel mixture was heated for 6 days after which the reaction was completed to give a settled powder and a clear solution. The reaction mixture was filtered and washed thoroughly with deionized water. The solids were dried in air overnight and then dried in an oven at 120° C. for 2 hours. The obtained solids (1.2 g) were analyzed by powder XRD and SEM. The powder XRD pattern of the resulting product is shown in FIG. 1 and indicates that the material was CHA.

Example 3

Figure 2:
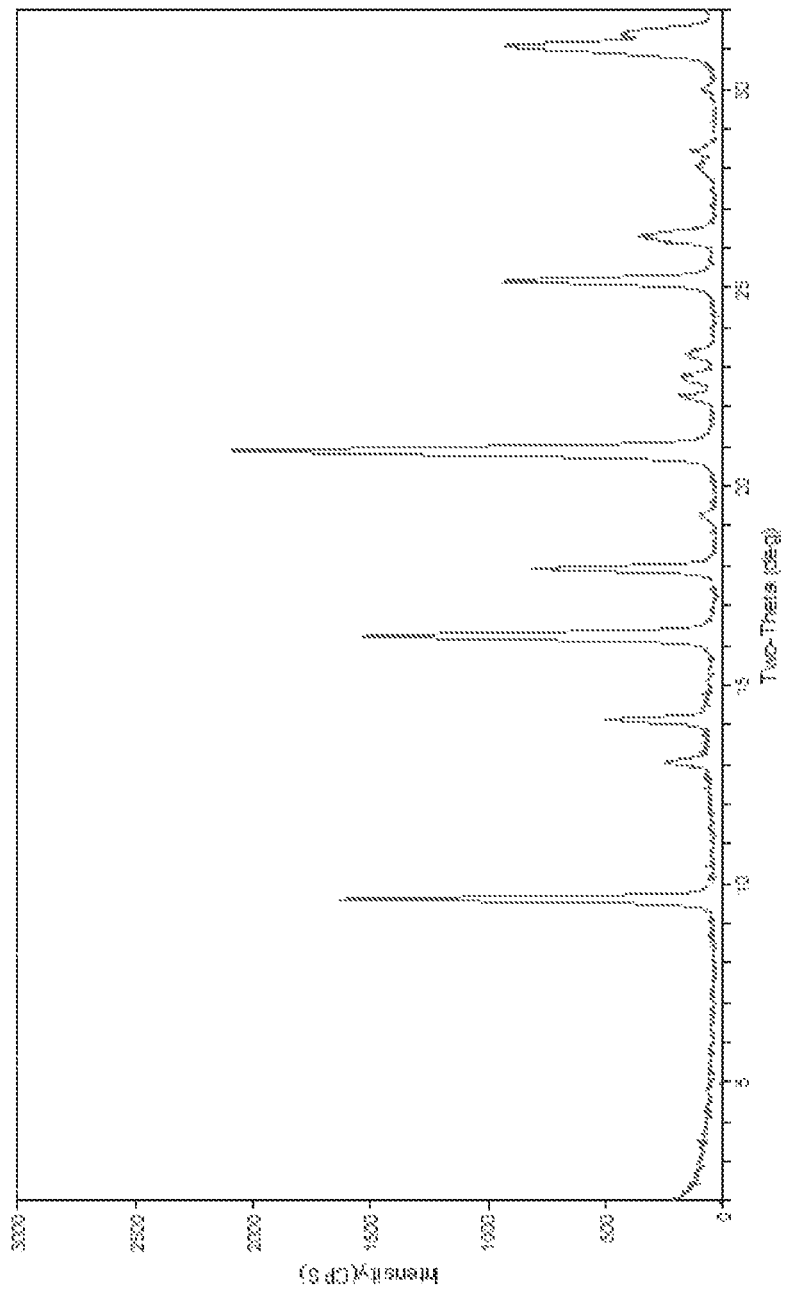
FIG. 2 shows a powder XRD pattern of the as-made aluminosilicate CHA molecular sieve prepared according to Example 3 of the present invention.

Example 2 above was repeated exactly but 0.06 g of as-made CHA from Example 2 was added. The reaction was completed in 4 days to give 1.2 g of CHA material. FIG. 2 and shows XRD patterns for the as-made CHA product.

Example 4

Calcination of CHA

Figure 3:
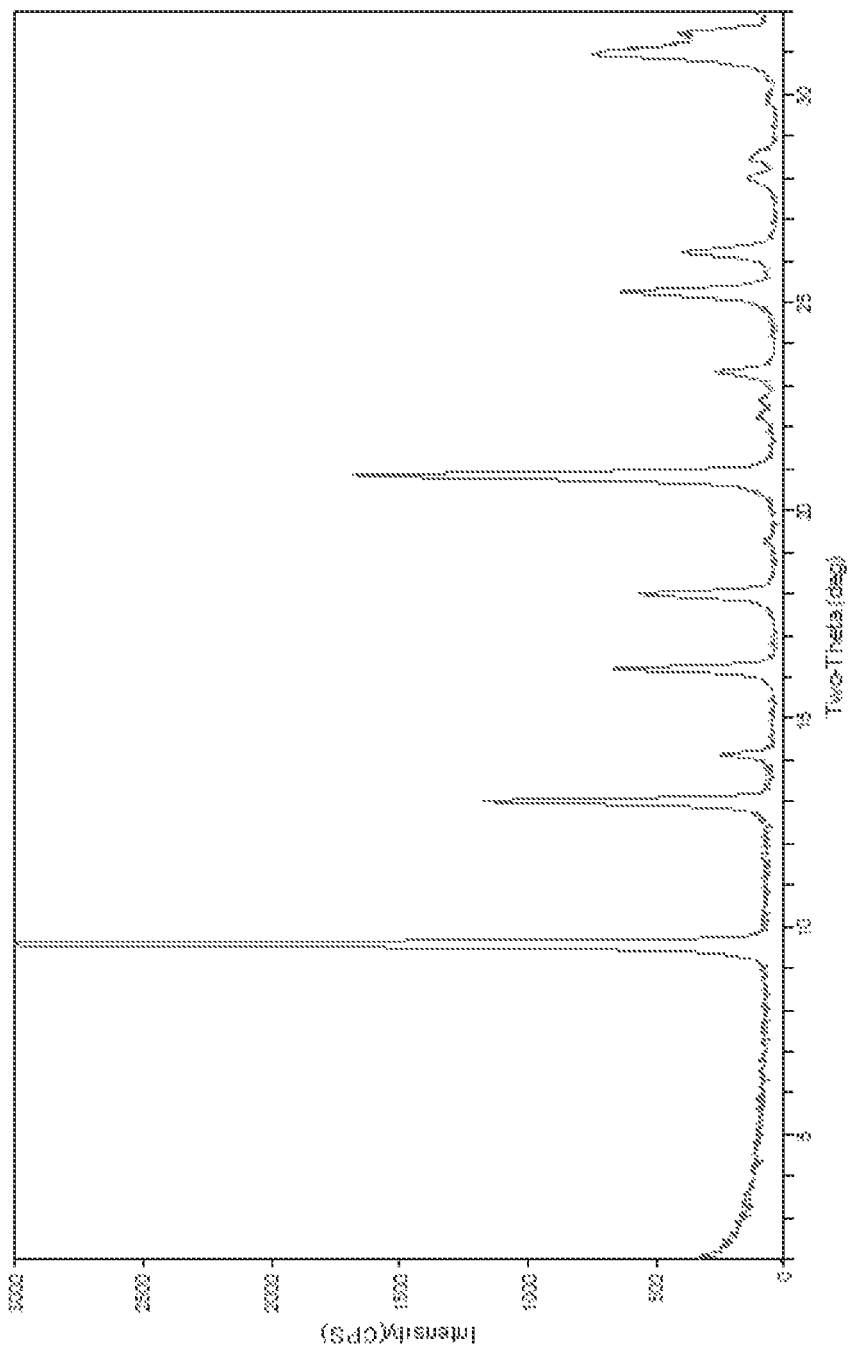
FIG. 3 shows a powder XRD pattern of the calcined aluminosilicate CHA molecular sieve prepared according to Example 2 of the present invention.
Figure 4:
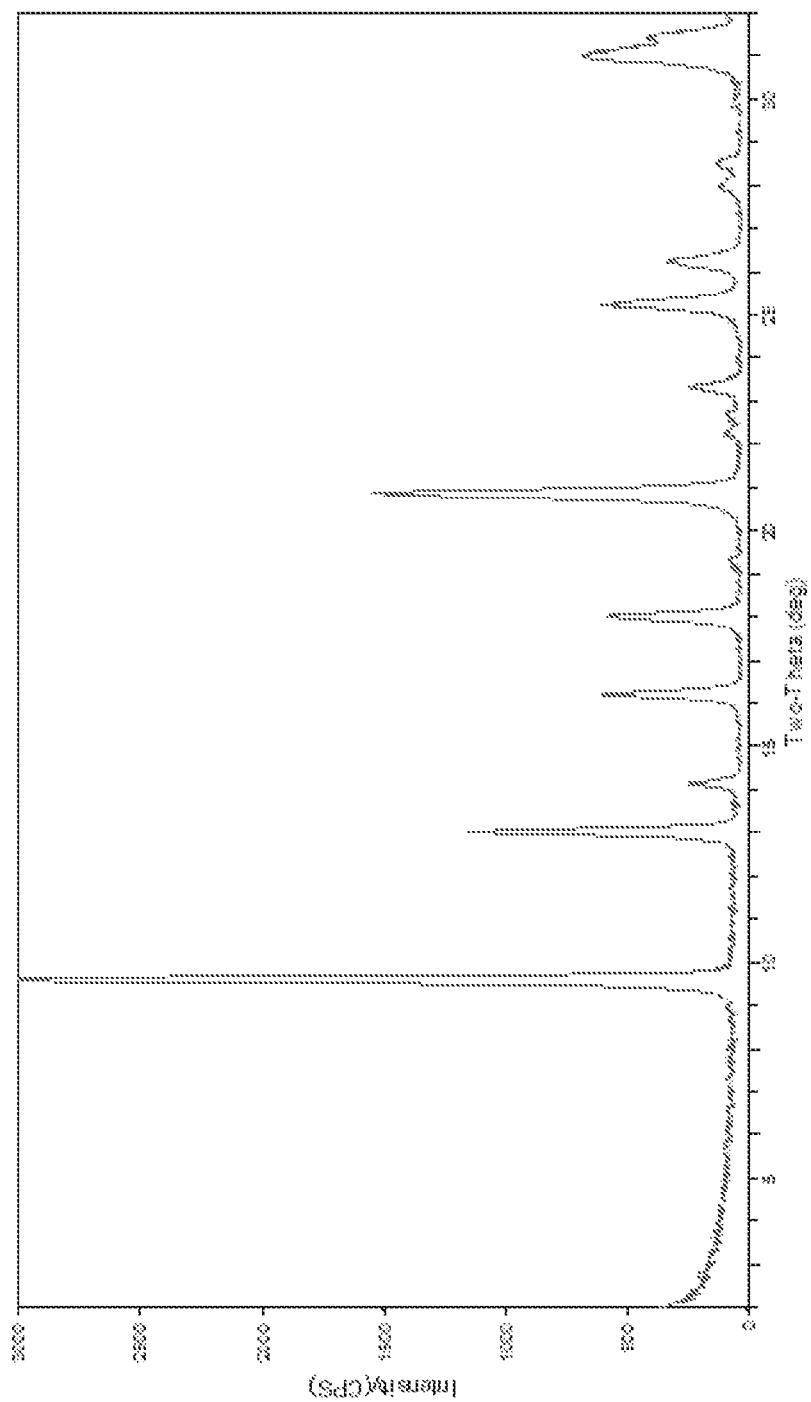
FIG. 4 shows a powder XRD pattern of the calcined aluminosilicate CHA molecular sieve prepared according to Example 3 of the present invention.

The as-synthesized product from Example 2 and 3 were calcined in air in a muffle furnace from room temperature to 120° C. at a rate of 1° C./minute and held at 120° C. for 2 hours. The temperature was then ramped up to 540° C. at a rate of 1° C./minute and held at 540° C. for 5 hours. The temperature was then increased at the same rate (1° C./min) to 595° C. at held at 595° C. for 5 hours. The powder XRD patterns of the calcined molecular sieve products are shown in FIGS. 3 and 4 (from Examples 2 and 3, respectively), and indicate that the materials remained stable after calcination to remove the organic SDA.

What is claimed is:

1. A method of preparing a CHA-type molecular sieve, comprising:
   (a) preparing a reaction mixture containing: (1) a colloidal aluminosilicate; (2) cationic 1,1,2-trimethyloctahydroindolium as the structure directing agent; (3) at least one source of an element selected from Groups 1 and 2 of the Periodic Table; (4) hydroxide ions; and (5) water; and
   (b) subjecting the reaction mixture to crystallization conditions sufficient to form crystals of the CHA-type molecular sieve.

2. The method of claim 1, wherein the molecular sieve is prepared from a reaction mixture comprising, in terms of mole ratios, the following:

| | |
|---|---|
| $SiO_2/Al_2O_3$ | 10-300 |
| $M/SiO_2$ | 0.01-0.3 |
| $Q/SiO_2$ | 0.05-0.4 |
| $OH^-/SiO_2$ | 0.1-0.8 |
| $H_2O/SiO_2$ | 5-50 | wherein:
(1) M is the at least one element selected from Groups 1 and 2 of the Periodic Table; and
(2) Q is the cationic structure directing agent.

3. The method of claim 2, wherein the molecular sieve has a composition comprising, in terms of mole ratios, the following:

| | |
|---|---|
| $SiO_2/Al_2O_3$ | 10-300 |
| $Q/SiO_2$ | 0.05-0.4 |
| $M/SiO_2$ | 0.01-0.3. |

4. The method of claim 2, wherein the molecular sieve has a composition comprising, in terms of mole ratios, the following:

| | |
|---|---|
| $SiO_2/Al_2O_3$ | 20-100 |
| $Q/SiO_2$ | 0.1-0.3 |
| $M/SiO_2$ | 0.02-0.1. |

5. The method of claim 1, wherein the molecular sieve is prepared from a reaction mixture comprising, in terms of mole ratios, the following:

| | |
|---|---|
| $SiO_2/Al_2O_3$ | 20-100 |
| $M/SiO_2$ | 0.02-0.1 |
| $Q/SiO_2$ | 0.1-0.3 |
| $OH^-/SiO_2$ | 0.2-0.4 |
| $H_2O/SiO_2$ | 15-30 | wherein:
   (1) M is the at least one element selected from Groups 1 and 2 of the Periodic Table; and
   (2) Q is the cationic structure directing agent.

6. The method of claim 5, wherein the molecular sieve has a composition comprising, in terms of mole ratios, the following:

| | |
|---|---|
| $SiO_2/Al_2O_3$ | 10-300 |
| $Q/SiO_2$ | 0.05-0.4 |
| $M/SiO_2$ | 0.01-0.3. |

7. The method of claim 5, wherein the molecular sieve has a composition comprising, in terms of mole ratios, the following:

| | |
|---|---|
| $SiO_2/Al_2O_3$ | 20-100 |
| $Q/SiO_2$ | 0.1-0.3 |
| $M/SiO_2$ | 0.02-0.1. |

8. The method of claim 1, wherein the molecular sieve has a composition, as made and in the anhydrous state, comprising, in terms of mole ratios, the following:

| | |
|---|---|
| $SiO_2/Al_2O_3$ | 10-300 |
| $Q/SiO_2$ | 0.05-0.4 |
| $M/SiO_2$ | 0.01-0.3 | wherein:
   (1) M is the at least one element selected from Groups 1 and 2 of the Periodic Table; and
   (2) Q is the cationic structure directing agent.

9. The method of claim 1, wherein the molecular sieve has a composition comprising, in terms of mole ratios, the following:

| | |
|---|---|
| $SiO_2/Al_2O_3$ | 20-100 |
| $Q/SiO_2$ | 0.1-0.3 |
| $M/SiO_2$ | 0.02-0.1 | wherein:
   (1) M is the at least one element selected from Groups 1 and 2 of the Periodic Table; and
   (2) Q is the cationic structure directing agent.

10. The method of claim 1, wherein the reaction mixture further comprises CHA seed crystals.

\* \* \* \* \*